(12) United States Patent
Curran et al.

(10) Patent No.: US 7,040,699 B2
(45) Date of Patent: May 9, 2006

(54) STOWABLE SEAT MOUNTED DISPLAY SCREEN

(75) Inventors: Thomas Curran, Macomb, MI (US);
Lawrence Jasinski, II, Clarkston, MI (US); Timothy W Anness, Rochester Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 5 days.

(21) Appl. No.: 10/733,662

(22) Filed: Dec. 11, 2003

(65) Prior Publication Data
US 2005/0140191 A1 Jun. 30, 2005

(51) Int. Cl.
*A47C 7/72* (2006.01)

(52) U.S. Cl. .............. 297/217.3; 297/188.05; 248/919

(58) Field of Classification Search ........... 297/188.04, 297/188.05, 188.15, 188.16, 217.3; 348/827, 348/837; 248/917–923, 278.1, 286.1
See application file for complete search history.

(56) References Cited

U.S. PATENT DOCUMENTS

| | | | |
|---|---|---|---|
| 4,756,528 A | 7/1988 | Umashankar | |
| 5,000,511 A * | 3/1991 | Shichijo et al. | 297/188.05 |
| 5,177,616 A * | 1/1993 | Riday | 297/217.3 |
| 5,179,447 A * | 1/1993 | Lain | 297/217.3 |
| 5,640,297 A | 6/1997 | Labaze | |
| 5,667,179 A * | 9/1997 | Rosen | 297/188.16 |
| 6,007,036 A * | 12/1999 | Rosen | 248/286.1 |
| 6,097,448 A | 8/2000 | Perkins | |
| 6,124,902 A | 9/2000 | Rosen | |
| 6,148,253 A | 11/2000 | Taguchi et al. | |
| 6,179,263 B1 * | 1/2001 | Rosen et al. | 297/188.15 |
| 6,181,387 B1 | 1/2001 | Rosen | |
| 6,216,927 B1 | 4/2001 | Meritt | |
| 6,256,837 B1 | 7/2001 | Lan et al. | |
| 6,292,236 B1 | 9/2001 | Rosen | |
| 6,375,259 B1 * | 4/2002 | Ma | 297/217.3 |
| 6,758,521 B2 * | 7/2004 | Imamura et al. | 297/217.3 |
| 2003/0057749 A1 * | 3/2003 | Buono | 297/217.3 |

\* cited by examiner

*Primary Examiner*—Peter R. Brown
(74) *Attorney, Agent, or Firm*—Ralph E. Smith

(57) ABSTRACT

A display assembly stowably mounted on a vehicle seatback, the display assembly comprising: a support arm having a seat end and a display end, and a viewing screen, where the seat end of the support arm is pivotably connected to the vehicle seatback; and the display screen is rotatably connected to the display end of said seat arm.

16 Claims, 2 Drawing Sheets

STOWABLE SEAT MOUNTED DISPLAY SCREEN

FIELD OF THE INVENTION

The present invention relates to an improved mounting for an LCD display in a vehicle. More specifically, the present invention is directed to a display screen mounted on a moveable arm for easily adjusting display positioning to facilitate viewing and stowage. The design is particularly adaptable for use with widescreen displays.

BACKGROUND OF THE INVENTION

Over a decade ago, falling prices and improvements in electronic technology made it possible for airlines to offer individual flat panel displays to business class and first class customers on most international flights (see, U.S. Pat. No. 4,756,528). Further improvements in technology, coupled with the reduced price and wide availability of movies on video cassettes prompted the development of aftermarket video systems for vehicles. Typically, such systems consisted of a rectangular box with a 4–6" cathode ray tube hard wired to a video cassette recorder. The box was designed to be secured to the backs of the driver and passenger seats and plug into the cigarette lighter to provide entertainment to rear seat passengers (see, U.S. Pat. No. 6,097,448).

These early transportable TV/VCR combinations were very successful despite the fact they initially sold for around a thousand dollars. Soon vehicles such as van conversions were offering built in systems and then auto manufacturers began to offer built in entertainment systems as a factory option on vehicles such as vans, mini-vans, and SUVs.

Most recently, flat panel displays have become readily available at a reasonable price. Such displays were first used by airplane manufacturers to provide every coach class passenger with an individual viewing screen embedded in the seat back of the preceding seat. See, for example, U.S. Pat. No. 5,640,297 which describes an LCD in an airline seatback. Similarly, U.S. Pat. No. 6,216,927 describes a transportable seatback entertainment system for an automobile. But this system can be relocated from side to side or mounted between the two front seats if there are two or more passengers in the back seat.

While the price of flat panel displays has been consistently decreasing, their cost is such that only high end vehicles are currently offered with a flat panel display in the back of the driver's and passenger's seat as found in couch section aircraft seats (see, U.S. Pat. No. 6,148,253). Instead, most vehicles with an entertainment system option use a flat panel display hinged or connected to the ceiling at one edge. Such screens are described in U.S. Pat. Nos. 6,124,902; 6,181,387; and 6,292,236. By mounting the screen on the ceiling in the center of the field of view of the rear seat passengers, a single small screen can be used by a passenger on the left, or on the right, or by two or three passengers simultaneously.

Unfortunately, small screens yield small images that can be tiring to look for any period of time. This problem is exacerbated when the screen is centrally located. In addition, locating a screen on the ceiling necessitates a thick headliner, makes installation of a standard sunroof impossible, and puts the screen above eye level. Most of these difficulties are compounded if a larger screen is used.

SUMMARY OF THE INVENTION

One object of the present invention is an improved mounting system for a vehicle display screen.

Another object of the present invention a vehicle screen mounted to permit easy, eye level viewing by single or multiple passengers.

Still another object of the invention is a vehicle screen that can be easily repositioned to improve viewing angle and/or position.

These and other objects of the invention are satisfied by a vehicle display assembly stowably mounted on a vehicle seatback that comprises: a support arm having a seat end and a display end, and a viewing screen; where the seat end of the support arm is flexibly connected to the vehicle seatback; and the display screen is flexibly connected to the display end of said seat arm.

DETAILED DESCRIPTION

A display assembly according to the present invention permits a vehicle display screen to be easily stowed in a protected position on a vehicle seat back and just as easily deployed. Mounting the screen on the seatback overcomes a number of problems with prior art devices. The current invention permits a single screen to be used by a single rear seat passenger sitting on either side of the vehicle. It permits easy viewing by two or more rear seat passengers. Not only can it be easily repositioned for viewing by one or many, it can also be repositioned at eye level for children or adults. Thus avoiding the extreme tilted head position required by ceiling mounted screens. In addition, avoiding a ceiling mount means a standard sun-roof or multiple full sun-roofs can be used. Finally the present display is closer to a center console entertainment center, thus simplifying the cost and difficulty of wiring connections and controls; and is flexible enough to accommodate a variety of screen types, sizes, and aspect ratios.

Figure 1:
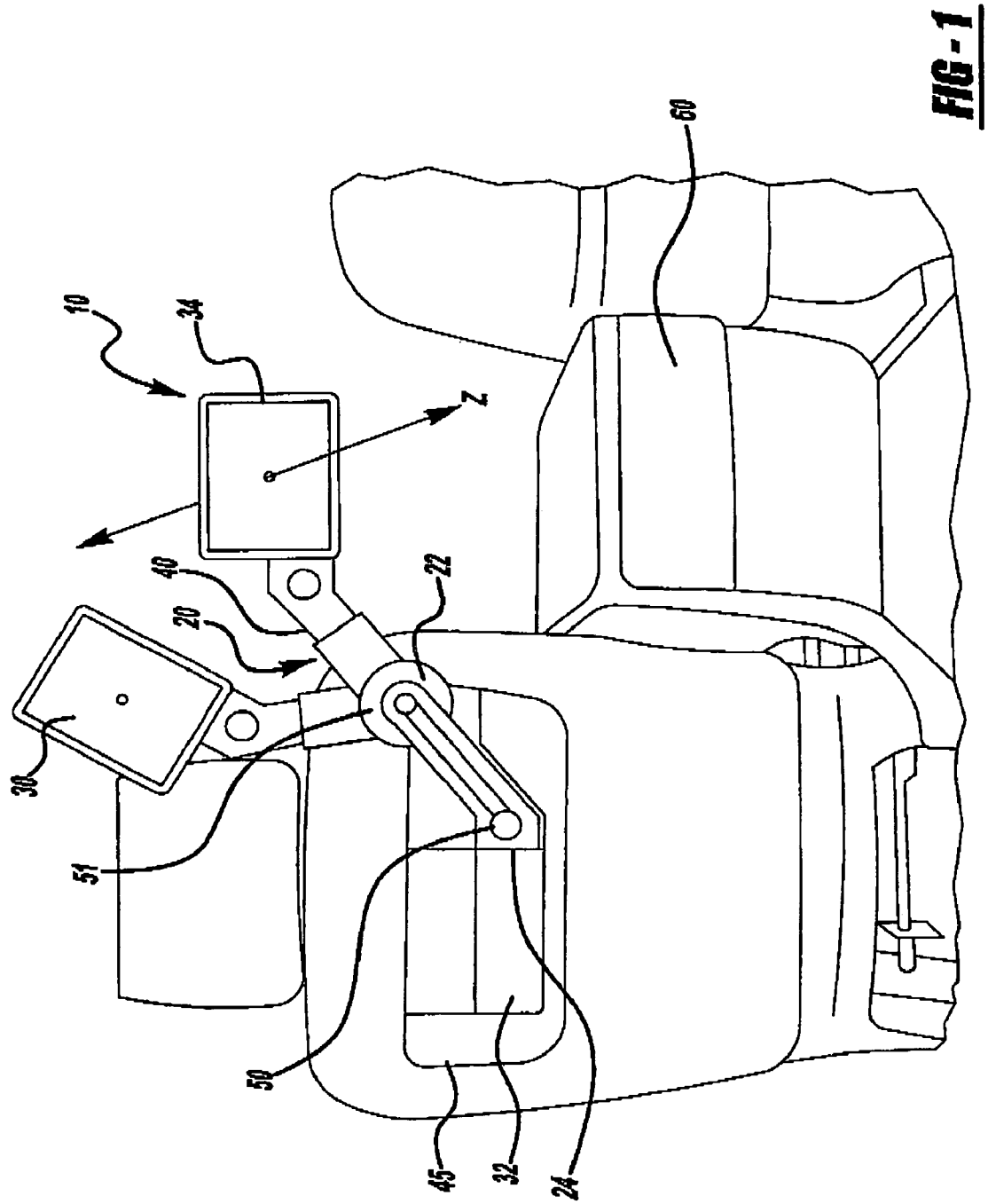
FIG. 1 is a view showing the deployment of the screen of the present invention.

In the Figures, like numbers refer to like parts. FIG. 1 illustrates an embodiment of the display assembly 10 of the present invention using a flat panel display 30 having an aspect ratio of 4:3 and a diagonally measured size of 12–14 inches. Liquid crystal displays of this aspect ratio and size are currently inexpensive and readily available.

In the display assembly 10, a support arm 20 is flexibly connected at the seat end 22 to said vehicle seatback and at the display end 24 to the display screen 30. These flexible connections may be accomplished using any standard universal joint type connection that permits at least 300 degrees of rotation in any axis. Such a universal joint may also be configured to permit the display screen to move fore and aft relative to the longitudinal axis of the vehicle (that is closer or farther away from a viewer along axis z), as well as rotate, pivot, and tilt about axes x and y. One universal joint adaptable to the present invention is the multi-shafted assembly as described in detail in U.S. Pat. No. 6,256,837 the contents of which are specifically incorporated herein by reference. Another example of such a universal joint is any of the various commercially available spring loaded ball joints.

Additional positional flexibility for the display assembly 10 is provided by a telescoping section 40 provided between the display end 24 and the seat end 22 of the support arm 20. Obviously, the ability to move the screen via the flexible connection 50 at the display end, to move the arm via the flexible connection 51 at the seat end 22 and to change the length of the support arm 20 via the telescoping section 40 permits an unprecedented ability for a viewer or viewers to position the screen 30 in any desired position to accommodate changes in seating position, number of viewers, glare, etc.

The degree of flexibility in positioning the screen in the present invention permits the screen 30 to be stowed 32 with the viewing surface of the screen positioned against the seat back in a protective housing 45. This protects the display from accidental damage by the occupants of the vehicle or when hauling luggage or cargo. (See, U.S. Pat. No. 6,148, 253 where individual screens are permanently mounted with the viewing surface exposed to damage in the backs of front seat headrests.)

Figure 2:
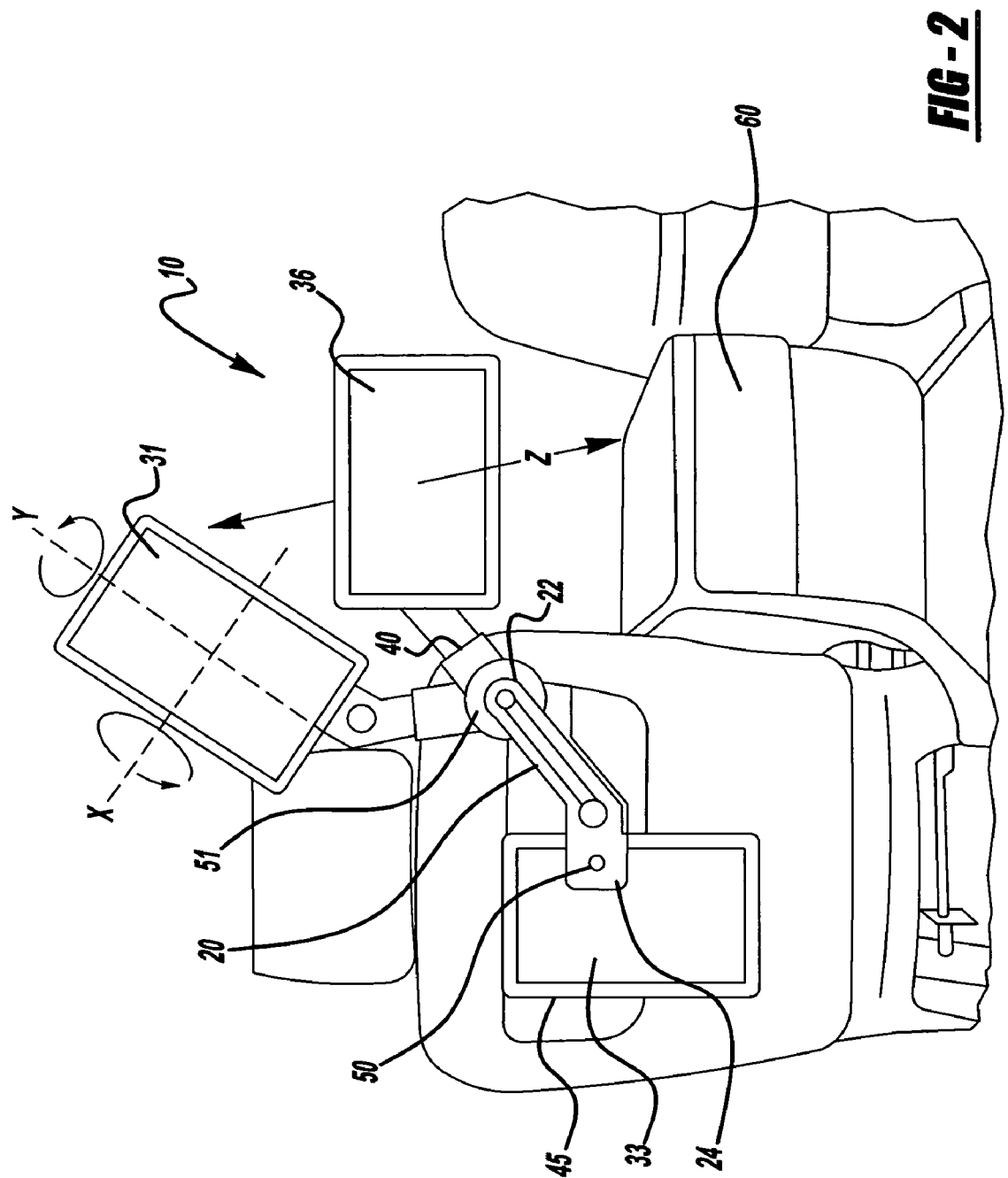
FIG. 2 is a view showing adaptability of the arm to a widescreen display.

FIG. 2 illustrates the adaptability of the present invention for use with the larger displays having a diagonal measurement of 17 inches, 21 inches, and greater. Such larger displays may have the common edge to edge aspect ratio of 4:3 or be widescreen display screens having an edge to edge aspect ratio of 16:9 as shown in FIG. 2. Such larger screens are entering the marketplace and it is inevitable that demand for them in vehicle applications will increase.

Because of its larger size, a 16:9 screen 31 is more susceptible to impact damage. This problem is completely resolved by the protection offered by the stowage housing 45 that permits the screen 31 be stowed 33 with the viewing surface facing the seat back. Deploying the screen 31 is analogous to deploying the smaller screen shown in FIG. 1. This involves repositioning the support arm 20, rotating the screen 31 about the x and y axis so that the viewing surface faces the passenger or passengers, and positioning the screen 36 along the z axis for optimum viewing position.

FIGS. 1 and 2 both illustrate an entertainment center 60 in the closed position. The entertainment center may be an electronic device or devices such as a video game, CD player, DVD player, VCR, GPS unit, computer, etc. By making the display screen 30 or 31 a touch screen, control of the entertainment center 60 can be integrated into the display screen 30 or 31. For example the entertainment center might consist only of a multiple disk CD/DVD changer behind a sealed door. A variety to CD/DVD's would be pre-loaded when the vehicle is stopped. A rear seat passenger could then select CD's or DCD's, select tracks or scenes, etc. when the vehicle was in motion while remaining securely belted into the seat by merely reaching forward and pulling the screen 30 or 31 into a position to easily operate the touch screen.

The present invention is usable with any flat panel type display known in the art such as a liquid crystal display (LCD), a digital light projection (DLP) display, and liquid crystal on silicon (LCOS) display, a plasma screen, and variations of these technologies. These screens may be of any available resolution such as 720×480, 1280×720, 1920×1080, etc.

It is to be understood that although the invention has been described with particular reference to specific embodiments, the forms of the invention shown and described are to be taken as a non-limiting embodiment and various changes and modifications, such as the development of thinner, lighter, larger screen having higher resolution, may be made to the invention without departing from its spirit and scope as described in the claims.

What is claimed is:

1. A display assembly mounted on a vehicle seatback having a seating surface and a rear surface formed on an opposite side of the seatback from the seating surface, the display assembly comprising:
    a support arm having a seat end connected to said rear surface of said vehicle seatback and a display end extending from said seat end; and
    a display screen connected to said display end of said support arm and positioned by said support arm to face away from said rear surface of said vehicle seatback when said display screen is in an in-use position;
    wherein said display screen pivots and rotates about said display end and said seat end pivots relative to said rear surface of said vehicle seatback to selectively stow said display screen in a housing positioned on said vehicle seatback.

2. The display assembly of claim 1, where said support arm has a telescoping section located between said display end and said seat end.

3. The display assembly of claim 1, where viewing angle for said display screen is adjusted by pivoting and rotating said display screen about said seat end and said display end of said support arm.

4. The display assembly of claim 1, where said display screen is flexibly connected to said display end via a connector that provides at least 300 degrees of rotation in any axis.

5. The display assembly of claim 1, further comprising:
    a first universal joint connecting said seat end to said vehicle seat back; and
    a second universal joint connecting said display end to said display screen.

6. The display assembly of claim 5, where said first universal joint and said second universal joint are configured to permit said display screen to move fore and aft.

7. The display assembly of claim 1, where said display screen has an edge to edge aspect ratio of 4:3.

8. The display assembly of claim 1, where said display screen has an edge to edge aspect ratio of 16:9.

9. The display assembly of claim 1, where said display screen is a touch sensitive screen.

10. The display assembly of claim 1, where said display screen is a liquid crystal display.

11. The display assembly of claim 1, where said display screen is a digital light projection display.

12. The display assembly of claim 1, where said display screen is a liquid crystal on silicon display.

13. The display assembly of claim 1, where said display screen is a plasma display.

14. The display assembly of claim 1, where said display screen has a diagonal measurement $\geq 12$ inches.

15. The display assembly of claim 1, where said display screen has a diagonal measurement $\geq 17$ inches.

16. The display assembly of claim 1, where said display screen has a diagonal measurement $\geq 21$ inches.

* * * * *